United States Patent
Ote et al.

(10) Patent No.: US 9,005,500 B2
(45) Date of Patent: Apr. 14, 2015

(54) METHOD OF MANUFACTURING FILM FOR FILM CAPACITOR AND FILM FOR FILM CAPACITOR

(75) Inventors: Michimasa Ote, Saitama (JP); Takashi Gonda, Saitama (JP); Junya Ishida, Saitama (JP); Kenro Takizawa, Saitama (JP); Kazuhiro Suzuki, Saitama (JP); Yuzo Morioka, Saitama (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 753 days.

(21) Appl. No.: 12/970,672

(22) Filed: Dec. 16, 2010

(65) Prior Publication Data

US 2011/0151187 A1    Jun. 23, 2011

(30) Foreign Application Priority Data

Dec. 17, 2009  (JP) ................................. 2009-285930

(51) Int. Cl.
| | |
|---|---|
| *B29C 47/10* | (2006.01) |
| *B29C 47/94* | (2006.01) |
| *B29C 47/92* | (2006.01) |

(Continued)

(52) U.S. Cl.
CPC ............ *B29C 47/10* (2013.01); *B29C 47/0021* (2013.01); *B29C 47/8845* (2013.01); *B29C 47/92* (2013.01); *C08J 5/18* (2013.01); *C08L 79/08* (2013.01); *H01G 4/18* (2013.01); *H01G 13/00* (2013.01); *B29C 47/14* (2013.01); *B29C 2947/92152* (2013.01); *B29C 2947/922* (2013.01); *B29C 2947/92228* (2013.01); *B29C 2947/92238* (2013.01); *B29C 2947/92285* (2013.01); *B29C 2947/92342* (2013.01); *B29C 2947/92438* (2013.01); *B29C 2947/92447* (2013.01); *B29C 2947/9259* (2013.01); *B29C 2947/92923* (2013.01); *B29K 2079/085* (2013.01); *B29K 2105/256* (2013.01);

(Continued)

(58) Field of Classification Search
None
See application file for complete search history.

(56) References Cited

U.S. PATENT DOCUMENTS

| | | | |
|---|---|---|---|
| 3,833,544 A | 9/1974 | Takekoshi et al. | |
| 5,064,594 A * | 11/1991 | Priester et al. | ................ 264/127 |

(Continued)

FOREIGN PATENT DOCUMENTS

| | | |
|---|---|---|
| JP | 57-9372 B2 | 2/1982 |
| JP | 59-500867 A | 5/1984 |

(Continued)

OTHER PUBLICATIONS

Norifumi Kanou, "Technical Trend for Capacitor Films", Convertech, No. 40, issue of Jul. 2006.
Denpa Shimbun, "High Technology", Issue No. 1142, Issued on Jan. 24, 2008.

*Primary Examiner* — Jeffrey Wollschlager
(74) *Attorney, Agent, or Firm* — Arent Fox LLP (57) ABSTRACT

When extrusion of a molten resin by means of an extruder is started, a simple polyetherimide resin is melt extruded from a lip portion 7*a* of a T-die 7, and a film of the simple polyetherimide resin is molded. The molding material is then switched to a resin composition including the polyetherimide resin and a fluorine resin and then a film of the resin composition is continuously extruded and molded from the T-die 7. Having been covered with a very thin film 8*a* of the simple polyetherimide resin, on a flow passage face of the lip portion 7*a* of the T-die 7, a resin composition layer 8*b* including a polyetherimide resin and a fluorine resin, which has affinity with the film 8*a*, is then formed at a center part.

13 Claims, 5 Drawing Sheets

(51) Int. Cl.

*B29C 47/00* (2006.01)
*B29C 47/88* (2006.01)
*C08J 5/18* (2006.01)
*C08L 79/08* (2006.01)
*H01G 4/18* (2006.01)
*H01G 13/00* (2013.01)
*B29C 47/14* (2006.01)
*B29K 79/00* (2006.01)
*B29K 105/00* (2006.01)

(52) U.S. Cl.
CPC .......... *C08J2379/08* (2013.01); *B29C 47/0004* (2013.01); *B29C 47/1072* (2013.01)

(56) References Cited

U.S. PATENT DOCUMENTS

| 2006/0078751 | A9* | 4/2006 | Gallucci et al. | 428/473.5 |
| 2006/0194070 | A1* | 8/2006 | Croll et al. | 428/473.5 |
| 2009/0118461 | A1* | 5/2009 | Weiser et al. | 528/353 |
| 2009/0253837 | A1* | 10/2009 | Takagi et al. | 524/102 |
| 2009/0306309 | A1* | 12/2009 | Ishio et al. | 525/519 |

FOREIGN PATENT DOCUMENTS

| JP | 2007-300126 A | | 11/2007 |
| JP | 2009141293 | * | 6/2009 |
| JP | 2009248525 | * | 10/2009 |
| WO | WO 83/04257 A1 | | 12/1983 |

* cited by examiner

| | | EXAMPLE 1 | EXAMPLE 2 | EXAMPLE 3 | EXAMPLE 4 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|---|---|
| MIXING COMPOSITION | PEI RESIN (PARTS BY WEIGHT) | 100 | 100 | 100 | 100 | 100 | 100 | 100 | 100 |
| | FLUORINE RESIN (PARTS BY WEIGHT) | 3 | 5 | 7 | 5 | — | — | 5 | 35 |
| | FLUORINE-BASED SURFACTANT (PARTS BY WEIGHT) | — | — | — | 0.2 | — | — | — | — |
| AMOUNT OF NITROGEN SUPPLY (L/H) | AMOUNT OF EXTRUSION PER 1 kg | 60 | 60 | 60 | 60 | 0 | 60 | 60 | 60 |
| | TOTAL AMOUNT OF SUPPLY | 420 | 420 | 420 | 420 | 0 | 420 | 420 | 420 |
| MANUFACTURING STABILITY | EXTRUSION OF SIMPLE PEI RESIN (MIN) | 60 | 60 | 60 | 60 | — | — | 0 | 60 |
| | OCCURRENCE OF STREAKS [OPERATING TIME] | NONE OBSERVED 12 HOURS LATER | NONE OBSERVED 12 HOURS LATER | NONE OBSERVED 12 HOURS LATE | NONE OBSERVED 12 HOURS LATER | NONE OBSERVED 12 HOURS LATER | NONE OBSERVED 12 HOURS LATER | OCCURRENCE OBSERVED 2 HOURS LATER | NO SAMPLE COULD BE MANUFACTURED DUE TO FILM PERFORATION AND BREAKAGE. |
| | ADHERING OF EYE MUCUS OR OCCURRENCE OF DIE LINES [OPERATING TIME] | NONE OBSERVED 12 HOURS LATER | NONE OBSERVED 12 HOURS LATER | NONE OBSERVED 12 HOURS LATER | NONE OBSERVED 12 HOURS LATER | OCCURRENCE OBSERVED 2 HOURS LATER | NONE OBSERVED 12 HOURS LATER | NONE OBSERVED 12 HOURS LATER | |
| FILM EVALUATION | FILM THICKNESS (MICRONS) | 4.48 | 4.38 | 5.22 | 4.82 | 5.15 | 4.86 | 4.95 | |
| | INSULATION BREAKDOWN VOLTAGE (V) | 1,050 | 1,060 | 1,220 | 1,080 | 1,230 | 1,190 | 1,010 | |
| | FRICTIONAL RESISTANCE VALUE (kgf) | 0.36 | 0.35 | 0.46 | 0.34 | 0.61 | 0.59 | 0.38 | |

METHOD OF MANUFACTURING FILM FOR FILM CAPACITOR AND FILM FOR FILM CAPACITOR

CROSS-REFERENCE TO RELATED APPLICATIONS

This application is based on and claims a priority from the prior Japanese patent Application No. 2009-285930 filed on Dec. 17, 2009, the entire contents of which are incorporated herein by reference.

BACKGROUND OF THE INVENTION

1. Field of the Invention

The present invention relates to a method of manufacturing a film for film capacitors and the film for the film capacitors.

2. Description of the Related Art

Capacitors can be classified into three kinds of capacitors, i.e., film capacitors, ceramic capacitors, and aluminum-electrolytic capacitors, according to kinds of dielectrics. Among these three kinds of capacitors, a film capacitor is superior to the other capacitors in terms of its characteristics that it is high in insulation property, is small in dielectric loss, and is small in characteristic change relative to a temperature or a frequency. This matter is described in Norifumi KANOU, "Technical Trend for Capacitor Films", Convertech, No. 40, issue of July, 2006, and Denpa Shimbun, High Technology, issue No. 1142, issued on Jan. 24, 2008.

This film for film capacitors is practically available by ensuring that: a dielectric layer is formed of a resin such as a polypropylene resin (PP resin), a polystyrene resin (PS resin), a polyethylene terephthalate resin (PET resin), a polycarbonate resin (PC resin), a polyvinylidene fluoride resin (PVDF resin), polytetrafluoroethylene resin (PTFT resin), a polyimide resin (PI resin), a polyphenylene sulfide resin (PPS resin), or a polyethylene naphthalate resin (PEN resin); and that a metal vapor deposition layer is formed as an electrode on each surface of the dielectric layer.

A film for film capacitors, which is currently practically available, is a film obtained from four kinds of resins such as a PP resin, a PET resin, a PPS resin, and a PEN resin, and films obtained from other resins are hardly used, since there is a problem associated with cost efficiency or processing adaptability. This matter is described in Norifumi KANOU, "Technical Trend for Capacitor Films", Convertech, No. 40, issue of July, 2006.

However, the film for film capacitors, made of the PP resin and the PET resin, show poor heat resistance, because the use temperature of the PP resin is 105 degrees centigrade or less and the use temperature of the PET resin is 125 degrees centigrade or less. Therefore, for example, if they are used as films for film capacitors of a hybrid vehicle which requires heat resistance of 150 degrees centigrade or more, it is inevitable to employ: (1) a method of installing large-sized cooling equipment without paying attention to a request for weight reduction; and (2) a method of installing a capacitor at, e.g., a driver's seat side which is distant from an engine room as a heat source without paying attention to space efficiency, and so problems associated with weight reduction and cost efficiency still remain unsolved.

In contrast to this, the film for film capacitors, made of the PPS resin, shows appropriate heat resistance, because its use temperature is 160 degrees centigrade or less. However, its applicability is limited, since it has low dielectric breakdown voltage and poor voltage proof. In addition, the film for film capacitors, made of the PEN resin, shows appropriate heat resistance because its use temperature is 160 degrees centigrade or less. However, its applicability is limited, since it has large dielectric loss and large temperature dependency of dielectric tangent. This matter is described in Norifumi KANOU, "Technical Trend for Capacitor Films", Convertech, No. 40, issue of July, 2006, and Denpa Shimbun, High Technology, issue No. 1142, issued on Jan. 24, 2008.

In view of the foregoing description, as described in Japanese Patent Application Laid-open No. 2007-300126, a film made of a polyetherimide resin (PEI resin) is noted as a film for film capacitors. The film for film capacitors, made of a polyetherimide resin, is preferable as a film for film capacitors, because of its excellent heat resistance due to its high glass transition point of 200 degrees centigrade or more, and of its excellent voltage proof due to its high dielectric breakdown voltage, and of its small frequency dependency and temperature dependency of dielectric tangent.

A thin film whose film thickness is 10 microns or less is used as a film for film capacitors. However, the film made of the polyetherimide resin lacks in film lubricity (or slidability), and therefore, sometimes causes troubles such as interruption of winding operation or slitting operation of the film, appearance of wrinkles on the film, and sticking of the film to guide rolls, etc., during manufacturing operation of the film. In addition, if film blocking may occur and then the wound film is released during capacity assembling, the film may break and cause a problem in the assembling. Therefore, there is need to improve slidability in order to use the film made of the polyetherimide resin as a film for film capacitors.

Japanese Patent Application Laid-open No. 2007-300126 discloses the use of a film for film capacitors which is obtained by applying plasma treatment to a film surface made of a polyetherimide resin in a fluorination atmosphere to thereby form a fluorinated surface on the film surface made of the polyetherimide resin.

A film obtained by forming a fluorinated surface on a film surface made of a polyetherimide resin, described in Japanese Patent Application Laid-open No. 2007-300126, is capable of improving film slidability. However, as described in Japanese Patent Application Laid-open No. 2007-300126, in a case where the film surface made of the polyetherimide resin is formed by applying plasma treatment in a fluorination atmosphere, a plasma treatment device is needed, and there are problems of higher manufacturing cost as well as complicated manufacturing.

On the other hand, in order to impart slidability to the film for film capacitors, made of the polyetherimide resin, a method of adding a fluorine resin is considered to be effective for reasons that required slidability can be imparted without affecting voltage proof, and that the resin is thermally stable even in a molding processing temperature exceeding 300 degrees centigrade.

Figure 5A:
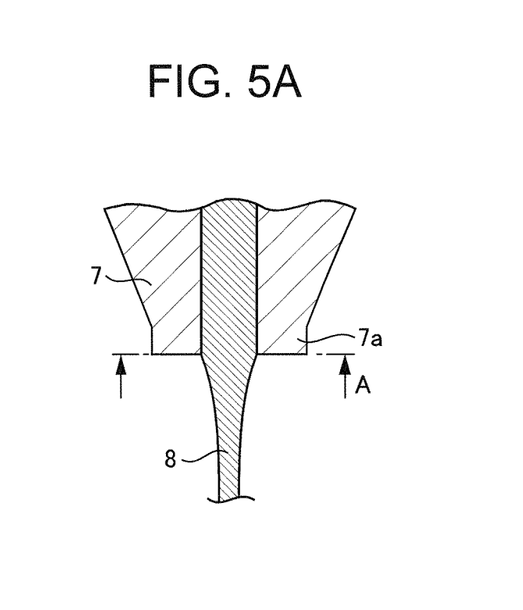
FIG. 5A is a sectional view of the vicinity of a lip portion of a T-die of a film molded by a conventional film manufacturing method.
Figure 5B:
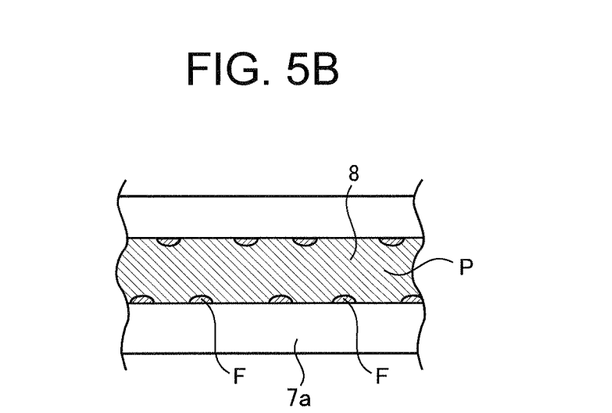
FIG. 5B is a sectional view of the vicinity of the lip portion of the T-die of the film molded by the conventional film manufacturing method.

However, in a case where a film for film capacitors is molded by a melt extrusion molding technique using a resin composition obtained by adding a fluorine resin to a polyetherimide resin as a molding material, when the resin composition melted and kneaded in an extruder is extruded from a T-die, the polyetherimide resin and the fluorine resin are separated each other, and the polyetherimide resin unevenly adheres to a flow passage face of a lip portion of the T-die. This phenomenon will be described with reference to FIG. 5A and FIG. 5B. FIG. 5A and FIG. 5B are sectional views of the vicinity of the lip portion of the T-die of a film molded by a conventional film manufacturing method. That is, as shown in FIG. 5A and FIG. 5B, the polyetherimide resin has high affinity with metal, whereas the fluorine resin has peel property relative to metal. Accordingly, stripes are formed by a portion at which a polyetherimide resin P adheres to the flow passage face of a lip portion 7a and a portion at which a fluorine resin F exposes on the flow passage face and the polyetherimide resin does not adhere due to the peel property of the fluorine resin F, whereby streaks occur in the extruded film for film capacitors. A difference in stress generated between a streaked portion and a streak-free portion causes wrinkles and in turn, there occurs a problem that a value of the film for film capacitors is extremely degraded.

Further, since the processing temperature during the film melt extrusion molding exceeds 300 degrees centigrade, the polyetherimide resin P adhering to the flow passage face of the lip portion 7a oxidizes and deteriorates to form an eye mucus-like adherent, and as a result, die lines exerted by being frictionally scrubbed by the eye mucus-like adherent occur with the film for film capacitors.

The present invention has been made in view of the above-described circumstances, and it is an object of the present invention to provide: a method of manufacturing a film for film capacitors, which is capable of readily and reliably manufacturing films for film capacitors having excellent heat resistance, voltage proof, and slidability or the like in which occurrences of streaks, wrinkles, and die lines are restrained; and a film for film capacitors manufactured by this manufacturing method.

SUMMARY OF THE INVENTION

In order to solve the above-described problems, a first aspect of the present invention is directed to a method of manufacturing a film for film capacitors, the method comprising:

injecting a molding material into an extruder, and then melt extruding the film for the film capacitor from a lip portion of a tip end of a T-die;

pinching and cooling the extruded film for the film capacitor between a pressure roll and a cooling roll in a pulling unit; and winding the cooled film for the film capacitor with a predetermined thickness by means of a winder, wherein:

a simple polyetherimide resin is melt extruded as the molding material at starting step of extrusion operation of the extruder in an inert gas atmosphere obtained by replacing air in the extruder with an inert gas; and the molding material is switched to a resin composition obtained by adding 1.0 to 30.0 parts by mass of a fluorine resin to 100 parts by mass of a polyetherimide resin after the simple polyetherimide resin is fully extruded and molded, to thereby mold the film for the film capacitor.

A second aspect of the present invention is directed to the method of manufacturing the film for the film capacitors, of the first aspect, wherein the predetermined thickness is a thickness of 10 microns or less.

A third aspect of the present invention is directed to the method of manufacturing the film for the film capacitor, of the first aspect, wherein melt extrusion of the simple polyetherimide resin is performed within 30 minutes or more and 2 hours or less.

A fourth aspect of the present invention is directed to the method of manufacturing the film for the film capacitor, of the first aspect, wherein a nitrogen gas is used as the inert gas and a supply amount of the nitrogen gas into the extruder is 10 L/hour or more and 100 L/hour or less as per 1 kg of an amount of extrusion per hour.

A fifth aspect of the present invention is directed to the method of manufacturing the film for the film capacitor, of the first aspect, wherein the resin composition is comprised of a resin composition obtained by adding 0.05 parts by mass to 5.0 parts by mass of a fluorine-based surfactant, to 100 parts by mass of a resin composition obtained by adding 1.0 part by mass to 30.0 parts by mass of a fluorine resin to 100 parts by mass of the polyetherimide resin.

A sixth aspect of the present invention is directed to the method of manufacturing the films for the film capacitor, of the first aspect, wherein a moisture content of the molding material including the polyetherimide resin or the resin composition of the polyetherimide resin and the fluorine resin is 5,000 ppm or less, prior to the melt extrusion.

A seventh aspect of the present invention is directed to the method of manufacturing the film for the film capacitor, of the first aspect, wherein a surface of the pressure roll consists of a silicone rubber or a fluorine rubber.

An eighth aspect of the present invention is directed to the method of manufacturing the film for the film capacitor, of the first aspect, wherein a surface of the cooling roll has a centerline average roughness of 1 micron to 10 microns.

A ninth aspect of the present invention is directed to the method of manufacturing the film for the film capacitor, of the first aspect, wherein the polyetherimide resin is obtained by alloying or blending one or more selected from a group consisting of a block copolymer, a random copolymer, or a modified copolymer with another monomer which can be copolymerized.

A tenth aspect of the present invention is directed to the method of manufacturing the film for the film capacitor, of the first aspect, wherein the polyetherimide resin includes one or more resins selected from a group consisting of: a thermoplastic polyimide-based resin such as a polyimide resin (PI resin) or a polyamide imide resin (PAI resin); a polyallylene ketone-based resin such as a polyether ether ketone resin (PEEK resin) or a polyether ketone resin (PK resin); an aromatic polyether sulfone-based resin such as a polysulphone resin (PSU resin), a polyether sulfone resin (PES resin) or a polyphenylene sulfone resin (PPSU resin); a polyallylene sulfide-based resin such as a polyphenylene sulfide resin (PPS resin) or a polyphenylene sulfide sulfone resin or a polyphenyl sulfide ketone resin; and a thermoplastic resin such as a liquid crystal polymer (LCP).

An eleventh aspect of the present invention is directed to the method of manufacturing the film for the film capacitor, of the first aspect, wherein the fluorine resin is one or more selected from a group consisting of: polytetrafluoroethylene (polytetrafluoroethylene resin, melting point: 325 to 330 degrees centigrade, continuous use temperature: 260 degrees centigrade); tetrafluoroethylene-perfluoroalkylvinylether copolymer (tetrafluoroethylene-perfluoroalkoxyethylene copolymer resin, melting point: 300 to 315 degrees centigrade, continuous use temperature: 260 degrees centigrade); tetrafluoroethylene-hexafluoropropyl copolymer (tetrafluoroethylene-hexafluoropropyl copolymer resin, melting point: 270 degrees centigrade, continuous use temperature: 200 degrees centigrade); tetrafluoroethylene-ethylene copolymer (tetrafluoroethylene-ethylene copolymer resin, melting point: 260 to 270 degrees centigrade, continuous use temperature: 150 degrees centigrade); polyvinylidene fluoride (fluorovinylidene resin, melting point: 170 to 175 degrees centigrade, continuous use temperature: 150 degrees centigrade); and polychlorotrifluoroethylene (polychlorotrifluoroethylene resin, melting point: 210 to 215 degrees centigrade, continuous use temperature: 120 degrees).

A twelfth aspect of the present invention is directed to the method of manufacturing the films for the film capacitor, of the first aspect, wherein the fluorine-based surfactant includes 0.05 parts by mass to 5.0 parts by mass of one or more selected from a group to 100 parts by mass of the resin composition including the polyetherimide resin and the fluorine resin; and the group consists of: potassium trifluoromethanesulfonate ($CF_3SO_3K$); sodium trifluoromethanesulfonate ($CF_3SO_3Na$); lithium trifluoromethanesulfonate ($CF_3SO_3Li$); potassium pentafluoroethane sulfonate ($C_2F_5SO_3K$); sodium pentafluoroethane sulfonate ($C_2F_5SO_3Na$); pentafluoroethane sulfonate lithium ($C_2F_5SO_3Li$); potassium heptafluoropropane sulfonate ($C_3F_7SO_3K$); sodium heptafluoropropane sulfonate ($C_3F_7SO_3Na$); lithium heptafluoropropane sulfonate ($C_3F_7SO_3Li$); potassium nonafluorobutane sulfonate ($C_4F_9SO_3K$); sodium nonafluorobutane sulfonate ($C_4F_9SO_3Na$); lithium nonafluorobutane sulfonate ($C_4F_9SO_3Li$); bis(heptafluoropropane sulfonyl)imide potassium salt (($C_3F_7SO_2)_2NK$); bis(heptafluoropropane sulfonyl)imide sodium salt (($C_3F_7SO_2)_2NNa$); bis(nonafluorobutane sulfonyl) imide potassium salt (($C_4F_9SO_2)_2NK$); bis(nonafluorobutane sulfonyl)imide sodium salt (($C_4F_9SO_2)_2NNa$); cyclo-hexafluoropropane-1,3-bis(sulfonyl)imide potassium salt ($CF_2(CF_2SO_2)_2NK$); cyclo-hexafluoropropane-1,3-bis(sulfonyl)imide sodium salt ($CF_2(CF_2SO_2)_2NNa$).

A thirteenth aspect of the present invention is directed to the method of manufacturing films for film capacitors, of the first aspect, wherein a lubricant includes 0.05 to 2.0 parts by mass of a polycondensation product of an ethylenediamine/stearic acid/sebacic acid with respect to 100 parts by mass of the resin composition including the polyetherimide resin and the fluorine resin.

A fourteenth aspect of the present invention is directed to a film for a film capacitor, wherein the film is a resin composition having a thickness of 0.5 microns to 10.0 microns and a centerline average roughness of 0.05 microns to 0.50 microns, including 1.0 to 30.0 parts by mass of a fluorine resin with respect to 100 parts by mass of a polyetherimide resin.

A fifteenth aspect of the present invention is directed to a film for film capacitors, of the fourteenth aspect, wherein the polyetherimide resin is obtained by alloying or blending one or more selected from a group consisting of a block copolymer, a random copolymer, or a modified copolymer with another monomer which can be copolymerized.

A sixteenth aspect of the present invention is directed to the film for film capacitors, of the fourteenth aspect, wherein the polyetherimide resin includes one or more resins selected from a group consisting of: a thermoplastic polyimide-based resin such as a polyimide resin (PI resin) or a polyamide imide resin (PAI resin); a polyallylene ketone-based resin such as a polyether ether ketone resin (PEEK resin) or a polyether ketone resin (PK resin); an aromatic polyether sulfone-based resin such as a polysulphone resin (PSU resin), a polyether sulfone resin (PES resin) or a polyphenylene sulfone resin (PPSU resin); a polyallylene sulfide-based resin such as a polyphenylene sulfide resin (PPS resin) or a polyphenylene sulfide sulfone resin or a polyphenyl sulfide ketone resin; and a thermoplastic resin such as a liquid crystal polymer (LCP).

A seventeenth aspect of the present invention is directed to the film for film capacitors, of the fourteenth aspect, wherein the fluorine resin is one or more selected from a group consisting of: polytetrafluoroethylene (polytetrafluoroethylene resin, melting point: 325 to 330 degrees centigrade, continuous use temperature: 260 degrees centigrade); tetrafluoroethylene-perfluoroalkylvinylether copolymer (tetrafluoroethylene-perfluoroalkoxyethylene copolymer resin, melting point: 300 to 315 degrees centigrade, continuous use temperature: 260 degrees centigrade); tetrafluoroethylene-hexafluoropropyl copolymer (tetrafluoroethylene-hexafluoropropyl copolymer resin, melting point: 270 degrees centigrade, continuous use temperature: 200 degrees centigrade); tetrafluoroethylene-ethylene copolymer (tetrafluoroethylene-ethylene copolymer resin, melting point: 260 to 270 degrees centigrade, continuous use temperature: 150 degrees centigrade); polyvinylidene fluoride (fluorovinylidene resin, melting point: 170 to 175 degrees centigrade, continuous use temperature: 150 degrees centigrade); and polychlorotrifluoroethylene (polychlorotrifluoroethylene resin, melting point: 210 to 215 degrees centigrade, continuous use temperature: 120 degrees centigrade).

An eighteenth aspect of the present invention is directed to the film for film capacitor, of the fifteenth aspect, wherein the fluorine-based surfactant includes 0.05 parts by mass to 5.0 parts by mass of one or more selected from a group to 100 parts by mass of the resin composition including the polyetherimide resin and the fluorine resin; and the group consists of: potassium trifluoromethanesulfonate ($CF_3SO_3K$); sodium trifluoromethanesulfonate ($CF_3SO_3Na$); lithium trifluoromethanesulfonate ($CF_3SO_3Li$); potassium pentafluoroethane sulfonate ($C_2F_5SO_3K$); sodium pentafluoroethane sulfonate ($C_2F_5SO_3Na$); lithium pentafluoroethane sulfonate ($C_2F_5SO_3Li$); potassium heptafluoropropane sulfonate ($C_3F_7SO_3K$); sodium heptafluoropropane sulfonate ($C_3F_7SO_3Na$); lithium heptafluoropropane sulfonate ($C_3F_7SO_3Li$); potassium nonafluorobutane sulfonate ($C_4F_9SO_3K$); sodium nonafluorobutane sulfonate ($C_4F_9SO_3Na$); lithium nonafluorobutane sulfonate ($C_4F_9SO_3Li$); bis(heptafluoropropane sulfonyl)imide potassium salt (($C_3F_7SO_2)_2NK$); bis(heptafluoropropane sulfonyl)imide sodium salt (($C_3F_7SO_2)_2NNa$); bis(nonafluorobutane sulfonyl)imide potassium salt (($C_4F_9SO_2)_2NK$); bis(nonafluorobutane sulfonyl)imide sodium salt (($C_4F_9SO_2)_2NNa$); cyclo-hexafluoropropane-1,3-bis(sulfonyl)imide potassium salt ($CF_2(CF_2SO_2)_2NK$); cyclo-hexafluoropropane-1,3-bis(sulfonyl)imide sodium salt ($CF_2(CF_2SO_2)_2NNa$).

A nineteenth aspect of the present invention is directed to the film for film capacitor, of the fifteenth aspect, wherein a lubricant includes 0.05 to 2.0 parts by mass of a polycondensation product of an ethylenediamine/stearic acid/sebacic acid with respect to 100 parts by mass of the resin composition including the polyetherimide resin and the fluorine resin.

According to the present invention, there can be provided a method of manufacturing a film for film capacitors, which is capable of readily and reliably manufacturing a film for film capacitors, having excellent heat resistance, voltage proof, and slidability or the like, in which occurrences of streaks or wrinkles and die lines are restrained, by melt extruding a simple polyetherimide resin as the molding material at starting step of extrusion operation of the extruder in an inert gas atmosphere obtained by replacing air in the extruder with an inert gas, and then, switching the molding material to a resin composition obtained by adding 1.0 to 30.0 parts by mass of a fluorine resin to 100 parts by mass of a polyetherimide resin to mold the film for film capacitors.

DESCRIPTION OF THE PREFERRED EMBODIMENTS

As a result of various discussions made to achieve the above-described object, the inventor et al of the present invention studied that: at starting step of extrusion operation of an extruder, a simple polyetherimide resin is used as a molding material; a film of the simple polyetherimide resin is extruded and molded from a lip portion of a T-die; and then, the molding material is switched to a resin composition including 1.0 part by mass to 30.0 parts by mass of a fluorine resin in 100 parts by mass of a polyetherimide resin; and the film of the resin composition is continuously extruded and formed from the T-die, thereby making it possible to readily manufacture a film for film capacitors in which occurrences of streaks or wrinkles in the extruded film for film capacitors are restrained.

Further, as the result of the discussion, the inventor et al found out that oxidization and/or deterioration of a film made of a simple polyetherimide resin which is prone to be formed on a flow passage face of a lip portion of a T-die is restrained by replacing the air in the extruder with an inert gas, making it possible to decrease the occurrences of an eye mucus-like solid matter and die lines, and reached completion of the present invention.

Figure 1A:
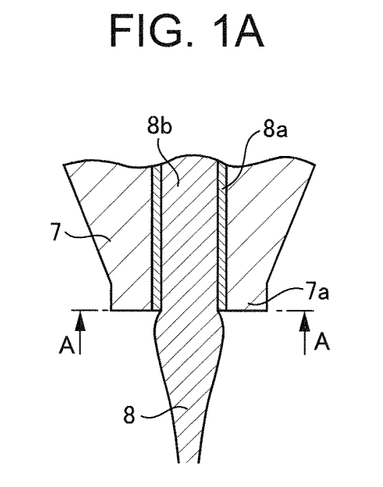
FIG. 1A is a sectional view of the vicinity of a lip portion of a T-die of a film to be molded by a film manufacturing method according to the present invention.
Figure 1B:
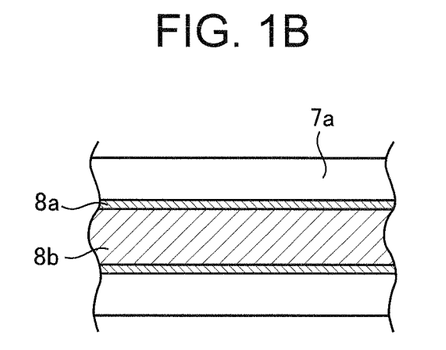
FIG. 1B is a sectional view of the vicinity of the lip portion of the T-die of the film to be molded by the film manufacturing method according to the present invention.

The above study will be described with reference to FIG. 1A and FIG. 1B. FIG. 1A and FIG. 1B are sectional views of the vicinity of a lip portion of a T-die of a film to be molded by a film manufacturing method according to the present invention. That is, as shown in FIG. 1A and FIG. 1B, at starting step of extrusion operation of a molten resin by means of an extruder, a simple polyetherimide resin is melt extruded from a lip portion 7a of a T-die 7, a film of the simple polyetherimide resin is molded, and then, the molding material of the simple polyetherimide resin is switched to a resin composition including the polyetherimide resin and a fluorine resin, and the film of the resin composition is continuously extruded and molded from the T-die, whereby a very thin film 8a of a simple polyetherimide resin is formed on a flow passage face of the lip portion 7a of the T-die 7. With the flow passage face of the T-die 7 being covered with the film 8a, a resin composition layer 8b including a polyetherimide resin, which has affinity with the film 8a, and a fluorine resin is formed at a center portion. As a result, separation of the polyetherimide resin and the fluorine resin in the resin composition, based upon affinity of the polyetherimide resin with the flow passage face of the lip portion 7a of the T-die, is restrained, and a film 8 in which occurrences of streaks or wrinkles are restrained can be readily and reliably molded in a state in which the heat resistance, voltage proof, and slidability, all of which are exerted by the resin composition layer 8b including the polyetherimide resin and the fluorine resin, are maintained.

In this case, by replacing the air in the extruder with an inert gas, it is made possible to restrain oxidization and/or deterioration of the film 8a made of a simple polyetherimide resin on the flow passage face of the lip portion 7a and then decrease the occurrences of eye mucus and die lines.

As to a required voltage proof of the film for film capacitors, a minimum dielectric breakdown voltage becomes a guiding index from the standpoint for assuring performance of capacitors. It is practically preferable that this value is 1,000V or more, and further, this is advantageous in terms of capacitor size reduction as well. Moreover, as to slidability, a frictional resistance value becomes a guiding index, and when this value is 0.5 or less, occurrences of failures, such as blocking of the films for film capacitors during capacitor assembling, can be restrained.

According to the present invention, heat resistance of being usable even at a temperature of 150 degrees centigrade or more can be obtained because of the use of a molding material consisting essentially of a polyetherimide resin whose glass transition point is 200 degrees centigrade or more. In addition, the dielectric breakdown voltage of the film for film capacitors exceeds 1,000V, thus allowing sufficient voltage proof to be imparted to a thin film for film capacitors.

Further, although the polyetherimide resin employed in the present invention is not limited in particular, for example, a resin having a repetition unit expressed by chemical formula (1) or (2) below can be taken as an example.

Methods of manufacturing polyetherimide resins can include methods described in Japanese Examined Patent Application Publication No. 57-9372 or Japanese Unexamined Patent Application Publication No. 59-500867, for example. Specific examples of the polyetherimide resins can include: Ultem 1000-1000 whose glass transition point is 211 degrees centigrade (Trade name, Available from SABIC Innovative Plastics Japan); Ultem 1010-1000 whose glass transition point is 223 degrees centigrade (Trade name, Available from SABIC Innovative Plastics Japan); and Ultem CRS 5001-1000 whose glass transition point is 235 degrees centigrade (Trade name, Available from SABIC Innovative Plastics Japan) or the like.

As polyetherimide resins, there can be used other block copolymers, random copolymers, or modified copolymers with monomers which can be copolymerized within a scope which does not negate an effect of the present invention. For example, there can be used Ultem XH6050-1000 (Trade name, Available from SABIC Innovative Plastics Japan) whose glass transition point is 252 degrees centigrade, which is a polyetherimide sulfone copolymer. In addition, one kind of the polyetherimide resin may be used solely or two kinds or more thereof may be used by alloying or blending them.

To molding materials for the film for film capacitors, without departing from the characteristics of the present invention, a known thermoplastic resin can be added, for example, a thermoplastic polyimide-based resin such as a polyimide resin (PI resin) or polyamide imide resin (PAI resin); a polyallylene ketone-based resin such as a polyether ether ketone resin (PEEK resin) or a polyether ketone resin (PK resin); an aromatic polyether sulfone-based resin such as a polysulphone resin (PSU resin), a polyether sulfone resin (PES resin) or polyphenylene sulfone resin (PPSU resin); a polyallylene sulfide-based resin such as a polyphenylene sulfide resin (PPS resin), a polyphenylene sulfide sulfone resin, or a polyphenylene sulfide ketone resin; or a liquid crystal polymer (LCP) and the like. Any liquid crystal polymer such as I-type, II-type, or III-type can be used.

In the present invention, in order to impart slidability to a film for film capacitors, a fluorine resin having a specific melt viscosity is mixed with a polyetherimide resin. The fluorine resin is a compound having a fluorine atom in a main chain of a molecular structure whose melt viscosity, measured by a flow tester employing a die of 1.0 mm in diameter and 10 mm in length under a condition of a temperature of 360 degrees centigrade and a load of 490 N, is 120,000 poises or less. If the melt viscosity of the fluorine resin exceeds 120,000 poises, the fluidity of the fluorine resin significantly lowers. As a result, a minute protrusion of the fluorine resin occurs on a film surface for film capacitors, the dielectric breakdown voltage of the film for film capacitors lowers, and a problem occurs with the voltage proof. Further, since fluidity is very small at high-melt viscosity, a gel is produced. Around this gel portion, perforation occurs with the film for film capacitors. Mechanical property of the film for film capacitors lowers due to faulty dispersion of the fluorine resin and breakage is prone to occur during manufacture of the film for film capacitors. As a result, there occurs a problem that the manufacture of the film for film capacitors is difficult.

In general, it is preferable that the fluorine resin is in a solid state at a temperature less than a melting point. For example, the fluorine resins can include: polytetrafluoroethylene (polytetrafluoroethylene resin, melting point: 325 to 330 degrees centigrade, continuous use temperature: 260 degrees centigrade. Hereinafter, abbreviated as PTFE resin); tetrafluoroethylene-perfluoroalkylvinylether copolymer (tetrafluoroethylene-perfluoroalkoxyethylene copolymer resin, melting point: 300 to 315 degrees centigrade, continuous use temperature: 260 degrees Centigrade. Hereinafter, referred to as PFA resin); tetrafluoroethylene-hexafluoropropyl copolymer (tetrafluoroethylene-hexafluoropropyl copolymer resin, melting point: 270 degrees centigrade, continuous use temperature: 200 degrees centigrade. Hereinafter, referred to as FEP resin); tetrafluoroethylene-ethylene copolymer (tetrafluoroethylene-ethylene copolymer resin, melting point: 260 to 270 degrees centigrade, continuous use temperature: 150 degrees centigrade. Hereinafter, abbreviated as ETFE resin); polyvinylidene fluoride (fluorovinylidene resin, melting point: 170 to 175 degrees centigrade, continuous use temperature: 150 degrees centigrade. Hereinafter, referred to as PVDF); polychlorotrifluoroethylene (polychlorotrifluoroethylene resin, melting point: 210 to 215 degrees centigrade, continuous use temperature: 120 degrees centigrade. Hereinafter, abbreviated as PCTFE resin) and the like. Among these fluorine resins, the PFA resin and the FEP resin are preferable in terms of their excellent heat resistance corresponding to their continuous use temperature of 200 degrees centigrade or more, cost efficiency, and easy handling. The PFA resin and the FEP resin may be used solely or may be used by blending them.

In order to impart slidability to a thermoplastic resin molding material or a thermosetting resin molding material, a method of adding a PTFE resin is generally effective. The PTFE resin is superior in heat resistance because its continuous use temperature is 260 degrees centigrade. However, because of its very high melt viscosity, the melt fluidity is hardly observed. Therefore, the PTFE resin exists as minute particles in a film for film capacitors manufactured by adding the PTFE resin to the thermoplastic resin to form a composition with the thermoplastic resin, and then, melt extrusion molding the composition. As a result of formation of a minute protrusion of the PTFE resin on the film surface for film capacitors as is the case with adding an inorganic composition, an dielectric breakdown voltage of the film for film capacitors lowers, and a problem occurs with the withstand voltage property. Further, because this resin has a high melt viscosity and a very low fluidity, a gel is produced. Because, at this gel portion, perforation occurs with the film for film capacitors and mechanical property of the film for film capacitors lowers due to a faulty dispersion of a fluorine resin, breakage is prone to occur during manufacture of the film for film capacitors. As a result, there occurs a problem that the manufacture of the film for film capacitors is difficult.

A liquid fluorine resin is not preferable, since it may have such adverse influences that it may bleed from the film for capacitors melt extruded and molded, causing a faulty metal vapor deposition layers as electrodes formed on both sides of the film for film capacitors, the metal vapor deposition layers may be peeled off and the inside of the capacitor may be contaminated.

The additive amount of fluorine resin is in the range of 1.0 part by mass to 30.0 parts by mass to 100 parts by mass of the polyetherimide resin, preferably in the range of 1.0 part by mass to 20.0 parts by mass, and more preferably in the range of 1.0 part by mass to 10.0 parts by mass. In a case where the additive amount of the fluorine resin is less than 1.0 part by mass, slidability cannot be sufficiently imparted to the film for film capacitors. Even if it is added in excess of 30.0 parts by mass, there is no change in effect of improvement of slidability of the film for film capacitors, and the additive amount of 30.0 parts by mass or less will be suffice. Further, if it is added in excess of 30.0 parts by mass, a rate of the fluorine resin becomes large, and therefore, its dielectric breakdown voltage lowers, and eligibility of the film for film capacitors also lowers. Moreover, because its tensile strength lowers and film breakage is prone to occur during manufacture of the film for film capacitors, it may become difficult to manufacture a thin film for film capacitors, and perforation may occur with the film for capacitor film, or metal vapor deposition performance may be adversely affected.

To a molding material made of a resin composition of a polyetherimide resin and a fluorine resin, a fluorine-based surfactant or a lubricant and the like can be added without departing from the characteristics of the present invention.

A compound having its decomposition temperature of 380 degrees centigrade or more is preferable as a fluorine-based surfactant. This is because the molding processing temperature of the resin composition of the polyetherimide resin and the fluorine resin can reach up to the order of 380 degrees centigrade. Specific examples of the fluorine-based surfactants can include: potassium trifluoromethanesulfonate ($CF_3SO_3K$); sodium trifluoromethanesulfonate ($CF_3SO_3Na$); lithium trifluoromethanesulfonate ($CF_3SO_3Li$); potassium pentafluoroethane sulfonate ($C_2F_5SO_3K$); sodium pentafluoroethane sulfonate ($C_2F_5SO_3Na$); lithium pentafluoroethane sulfonate ($C_2F_5SO_3Li$); potassium heptafluoropropane sulfonate ($C_3F_7SO_3K$); sodium heptafluoropropane sulfonate ($C_3F_7SO_3Na$); lithium heptafluoropropane sulfonate ($C_3F_7SO_3Li$); potassium nonafluorobutane sulfonate ($C_4F_9SO_3K$); sodium nonafluorobutane sulfonate ($C_4F_9SO_3Na$); lithium nonafluorobutane sulfonate ($C_4F_9SO_3Li$); bis(heptafluoropropane sulfonyl)imide potassium salt (($C_3F_7SO_2)_2NK$); bis(heptafluoropropane sulfonyl) imide sodium salt (($C_3F_7SO_2)_2NNa$); bis(nonafluorobutane sulfonyl)imide potassium salt (($C_4F_9SO_2)_2NK$); bis(nonafluorobutane sulfonyl)imide sodium salt (($C_4F_9SO_2)_2NNa$); cyclo-hexafluoropropane-1,3-bis(sulfonyl)imide potassium salt ($CF_2(CF_2SO_2)_2NK$); cyclo-hexafluoropropane-1,3-bis(sulfonyl)imide sodium salt ($CF_2(CF_2SO_2)_2NNa$) and the like.

The fluorine-based surfactant has a function of stabilized dispersion of the fluorine resin and improves uniform dispersion and stabilized dispersion of the fluorine resin in the polyetherimide resin. The additive amount is preferable in the range of 0.05 parts by mass to 5.0 parts by mass to 100 parts by mass of the resin composition including the polyetherimide resin and the fluorine resin. If the additive amount is less than 0.05 parts by mass, the effect of the addition does not appear. On the contrary, if it exceeds 5.0 parts by mass, undesirable effects occur such that unmelted substance remains or lubricity becomes too high, making extrusion unstable during melt extrusion molding operation.

Those which are preferable as lubricants are amide-based waxes manufactured by reacting a calboxylic acid and diamine with each other. Among them, there is higher fatty acid polyamide whose softening point exceeds 200 degrees centigrade, manufactured by reacting a mixture of a higher aliphatic monocarboxylic acid as a carboxylic acid and a polybasic acid. A saturated aliphatic monocarboxylic acid and a hydroxycarboxylic acid having a carbon number of 16 or more are preferable as a higher aliphatic monocarboxylic acid, and specific examples can include a palmitic acid, a stearic acid, a behenic acid, a montanic acid, a hydroxystearic acid and the like. Polybasic acids include carboxylic acids having dibasic acids or more, and specific examples can include: aliphatic dicarboxylic acids such as a malonic acid, a succinic acid, an adipic acid, a pimelic acid, an azelaic acid, and a sebacic acid; aromatic dicarboxylic acids such as a phthalic acid and a terephthalic acid; and alicyclic dicarboxylic acids such as a cyclohexane dicarboxylic acid, a cyclohexane dicarboxylic acid, a cyclohexyl succinic acid. Diamines can include: ethylene diamine; 1,3-diaminopropane; 1,4-diaminobutane; hexamethylenediamine; methaxylylenediamine; trilenediamine; paraxylylenediamine; phenylenediamine; isoholondiamine and the like. A specific example of this compound can include a polycondensation product of an ethylenediamine/stearic acid/sebacic acid.

The above mentioned lubricants impart lubricity relative to an extruder or a die metal face to a molten resin during melt extrusion molding, and in particular, attain an effect of preventing adhesion of the molten resin to a die lip portion and then reducing occurrences of die lines. The additive amount is preferable in the range of 0.05 to 2.0 parts by mass to 100 parts by mass of the resin composition including the polyetherimide resin and the fluorine resin. If the additive amount is less than 0.05 parts/mass, the effect of the addition does not appear. On the contrary, if it exceeds 2.0 parts by weight, because lubricity becomes too high, making extrusion unstable during melt extrusion molding, it is not preferable.

The film for film capacitors, in the present invention, is manufactured by a melt extrusion molding technique employing a T-die. This technique is directed to a method of manufacturing films for film capacitors, characterized in that: using an extruder such as a single screw extruder or a twin screw extruder, a molding material made of a polyetherimide resin or a resin composition of a polyetherimide resin and a fluorine resin is melted and kneaded in an atmosphere prepared by replacing the air existing in the extruder and in a gap between the molding materials with an inert gas; the film for film capacitors is melt extruded from a lip portion at a tip end of a T-die disposed at a tip end of the extruder; the film for film capacitors is pinched and cooled between a pressure roll and a cooling roll. Finally, the film is continuously wound around a winding pipe by means of a winder, thereby manufacturing the film for film capacitors.

Figure 2:
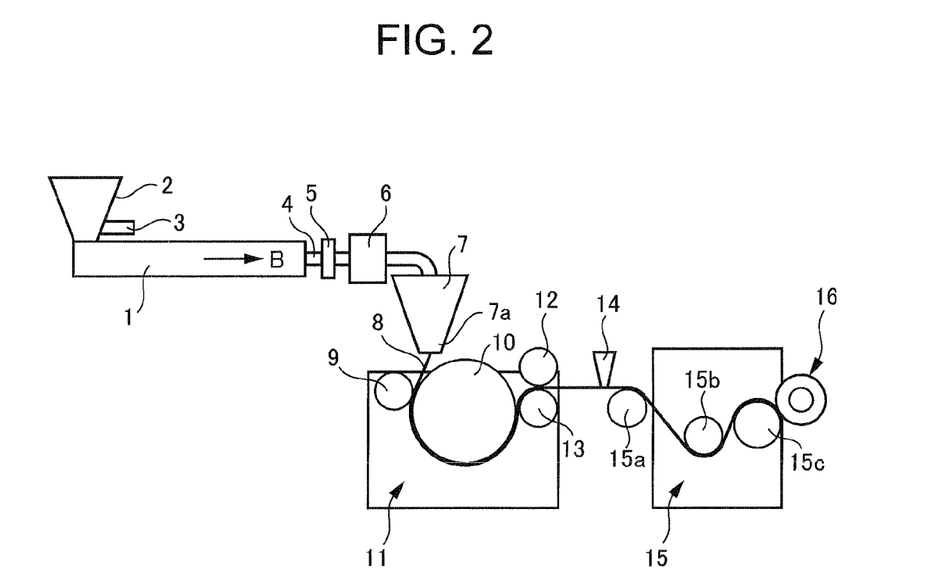
FIG. 2 is a view showing a schematic configuration of a film manufacturing apparatus according to one embodiment of the present invention.
Figure 3:
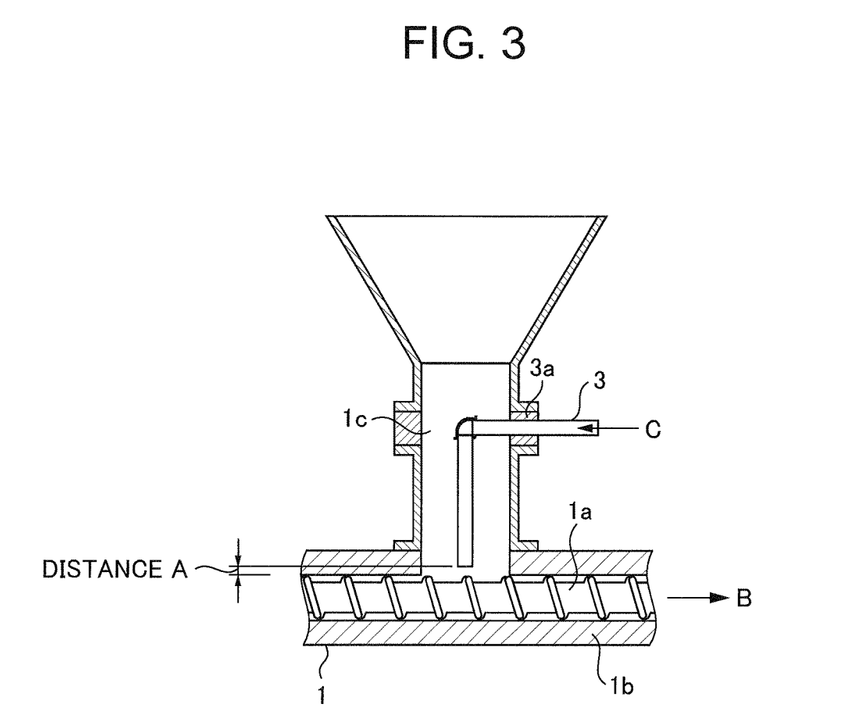
FIG. 3 is a sectional view of the vicinity of a material injection hopper of the film manufacturing apparatus shown in FIG. 2.

A schematic configuration of an apparatus of manufacturing films for film capacitors, according to one embodiment of the present invention, will be described with reference to FIG. 2 and FIG. 3. FIG. 2 is a view showing a schematic configuration of the film manufacturing apparatus according to one embodiment of the present invention. FIG. 3 is a sectional view of the vicinity of a material injection hopper of the film manufacturing apparatus shown in FIG. 2. As shown in FIG. 2, the apparatus of manufacturing films for film capacitors, according to one embodiment of the present invention, is provided with a material injection hopper 2 for injecting a molding material, an extruder 1, a T-die 7, a pulling unit 11, and a winder 15. In addition, a gas supply pipe 3 is inserted via a spacer 3a into the material injection hopper 2 for injecting molding materials, as shown in FIG. 3. Further, the gas supply pipe 3 is extended up to the vicinity of an outer circumferential end of an extrusion screw 1a of the extruder 1 with a tip end of the gas supply pipe 3 passing through a center part of a material injection port 1c. Therefore, the oxygen contained in the molding material injected from the material injection hopper 2 and in the extruder 1 is replaced with an inert gas when a molding material is mixed and stirred by means of the extrusion screw 1a of the extruder 1. This matter will be described later.

The extruder 1 transports a molding material in the direction indicated by the arrow B while the molding material is mixed and stirred by means of the extrusion screw 1a, and heats and melts the molding material by a thermoelectric means incorporated in a cylinder 1b. The molding material thus melted and transported is supplied to a filter means via a connection pipe 4. An unmelted molding material is then separated by means of a filter 5, and the molten molding material is supplied to a gear pump 6. In the gear pump 6, the molten molding material is extruded to a T-die 7 while a pressure to the molten molding material is increased. In the T-die 7, the molten molding material is extruded at a predetermined pressure and then a film 8 of a predetermined thickness and a predetermined width is molded from the lip portion 7a of the T-die 7. The film 8 thus molded is adjusted to a predetermined thickness by means of a pressure roll 9 while being pulled on an outer circumferential face of a cooling roll 10 of the pulling unit 11, and the film having a predetermined thickness is cooled and solidified and then is transported to the winder 15 by a pair of transport rolls 12, 13.

In the winder 15, the film 8 is guided by means of guide rolls 15a, 15b, 15c and then is wound by means of a winding pipe 16. A thickness measuring instrument 15 is arranged between the transport roll pair 12, 13 and the guide roll 15a, allowing a circumferential velocity of the cooling roll 10 to be adjusted or controlled based upon the thickness measured by means of the thickness measuring instrument 14 so as to obtain a desired thickness.

In this case, the moisture content of a molding material made of a polyetherimide resin or a resin composition of a polyetherimide resin and a fluorine resin is adjusted to 5,000 ppm or less, preferably to 2,000 ppm or less prior to melt extrusion molding. This is because, if the moisture content exceeds 5,000 ppm, a film for film capacitors may be foamed. A method of adjusting the moisture content can be implemented by means of a hot air dryer.

Inert gases for use in the present invention can include a nitrogen gas, a carbon dioxide gas, and the like, in addition to a helium gas, a neon gas, an argon gas, a krypton gas and the like. Among them, the nitrogen gas is preferable because it is easily handled and can be used inexpensively.

The nitrogen gas may be supplied to a material injection port by a method of obtaining the gas from a nitrogen gas generation device, a method of obtaining the gas from a nitrogen gas cylinder, or a method of obtaining the gas by evaporating a liquid nitrogen and the like. The method of obtaining the gas from the nitrogen gas cylinder and the method of obtaining the gas by evaporating the liquid nitrogen are preferable from the viewpoint of the purity of the nitrogen gas. In particular, the method of obtaining the gas by evaporating the liquid nitrogen can be preferably used, since impurity water changes to an ice and then is removed in a process of liquefying nitrogen, thus allowing purity of the nitrogen gas to be high.

In order to replace the air atmosphere of the inside of the extruder with a nitrogen gas atmosphere, the nitrogen gas is supplied from the material injection port of the extruder together with the molding material, whereby the air existing in the extruder and in a gap between the molding materials may be replaced with the nitrogen gas. Although a method of supplying the nitrogen gas from the material injection port into the extruder is not limitative in particular, the shorter the distance from the outer circumferential end of the extrusion screw in the extruder to a nitrogen gas supply position is, the better it is, since the efficiency of replacement of the air with the nitrogen gas becomes high. Hereinafter, one example is shown with reference to FIG. 3. The gas supply pipe 3 may be installed for the sake of gas supply, between the material injection port 1c of the extruder 1 and the material injection hopper 2 installed thereon, through a center part of the material injection port 1c, so that a distance A from the outer circumferential end of the extrusion screw 1a to a lower end of the gas supply pipe 3 is obtained as a gap of 5 mm or more and 20 mm or less, preferably 5 mm or more and 15 mm or less, more preferably 5 mm or more and 10 mm or less. If the distance A from the outer circumferential end of the extrusion screw 1a to the lower end of the gas supply pipe 3 is less than 5 mm, movement of the molding material pellets is precluded or the gas supply pipe is lowered due to the weight of the molding material, whereby the pipe may interfere with the extrusion screw. On the contrary, if the distance A exceeds 20 mm, movement of the molding material pellets is smooth, whereas replacement of the air with the nitrogen gas is insufficient and the oxygen in the air flows into the extruder 1, causing oxidization or deterioration of the polyetherimide resin, and therefore, this is not preferable. A metallic pipe is preferable as the gas supply pipe 3, whereas there may be a plastic pipe or the like without being limitative thereto. In addition, a vinyl hose or the like may be fixed and used instead of such a pipe. In order to fix the gas supply pipe between the material injection port 1c of the extruder 1 and the material injection hopper 2 installed thereon, a jig such as a spacer is provided, whereby the gas supply pipe may be retained.

The supply amount of the nitrogen gas into the extruder is 10 L/hour or more and 100 L/hour or less, preferably 15 L/hour or more and 90 L/hour or less, more preferably 20 L/hour or more and 80 L/hour or less, with regard to the amount of extrusion of 1 kg/hour. If the amount of supply of the nitrogen gas is less than 10 L/hour with regard to the amount of extrusion of 1 kg/hour, replacement of the air with the nitrogen gas is insufficient and then the oxygen in the air flows into the extruder, making it impossible to prevent oxidization or deterioration of the polyetherimide resin. On the contrary, even if the nitrogen gas is supplied in excess of 100 L/hour, only the relevant costs increase in spite of a saturated effect due to the complete replacement of the air with the nitrogen gas, and therefore, this is not preferable.

In the present invention, at starting step of extrusion operation of the extruder, it is mandatory to melt extrude a simple polyetherimide resin. First, a film of the simple polyetherimide resin is formed on a flow passage face of a lip portion of a T-die by melt extruding the simple polyetherimide resin. Time for melt extruding the simple polyetherimide resin may be approximately 30 minutes or more after extrusion has been started. If it is less than 30 minutes, extrusion operation is not stable, and no film may be formed. In addition, there is no need to melt extrude the simple polyetherimide resin for 2 hours or more after extrusion has been started. This is because a film is formed within 2 hours after extrusion has been started. If a resin composition including a polyetherimide resin and a fluorine resin has been melt extruded at the starting step of the extrusion operation, without melt extruding the simple polyetherimide resin, streaks occur with the extruded film for film capacitors, and wrinkles occur under the influence of the occurrence of such streaks. This phenomenon occurs because the polyetherimide resin and the fluorine resin are separated and then the polyetherimide resin unevenly adheres to the flow passage face of the lip portion of the T-die. The polyetherimide resin has high affinity with metal, whereas the fluorine resin has peel property with metal; and therefore, stripes are formed by a portion at which the polyetherimide resin adheres to the flow passage face of the lip portion and a portion at which the polyimide resin does not adhere due to the peel property of the fluorine resin, whereby streaks occur with the extruded film for film capacitors.

In the present invention, it is mandatory to perform melt extrusion operation in a nitrogen gas atmosphere prepared by replacing the air in the extruder with an inert gas, preferably with a nitrogen gas. This is for preventing oxidization or deterioration of the polyetherimide resin existing as a film on the flow passage face of the lip portion of the T-die. A film of the polyetherimide resin is heated over a long period of operation time; and therefore, oxidization or deterioration occurs in the presence of oxygen, and an eye mucus-like adherent occurs with the lip portion, causing occurrences of die lines. The above melt extrusion operation is mandatory to prevent the occurrences of the die lines and retain a stable film.

According to the film for film capacitors of the present invention, minute unevenness can be formed on a film surface for film capacitors in order to prevent blocking of the film for film capacitors during capacitor assembling. As a method thereof, it is convenient and appropriate to form minute unevenness in advance on an outer circumferential face of the aforementioned metallic cooling roll, and then, to press the molten film for film capacitors toward the cooling roll using a pressure roll. As a result, the minute unevenness formed on the outer circumferential face of the cooling roll are transferred onto the film surface for film capacitors.

Unevenness of the cooling roll surface is 1 micron to 10 microns in centerline average roughness, preferably 2 microns to 7 microns in the centerline average roughness, further preferably 2 microns to 5 microns in the centerline average roughness. If the centerline average roughness is less than 1 micron, it becomes difficult to form minute unevenness on the film surface for film capacitors. If the centerline average roughness exceeds 10 microns, the film adheres thermally with the cooling roll, resulting in breakage of the film.

The minute unevenness of the film surface for film capacitors is 0.05 micron to 0.50 micron in the centerline average roughness, preferably 0.10 micron to 0.40 micron or 0.15 micron to 0.35 micron. If the centerline average roughness is less than 0.05 micron, depositability of aluminum vapor may lower in an aluminum vapor deposition process for the film for film capacitors during manufacture of film capacitors or slidability of the film for film capacitors may lower.

In order to contact the film for film capacitor with the metallic cooling roll surface firmly, a surface of the pressure roll is formed using a natural rubber, an isoprene rubber, a butadiene rubber, a norbornene rubber, acrylonitryle-butadiene rubber, nitryle rubber, an urethane rubber, a silicone rubber, a fluorine rubber or the like. A silicone rubber or a fluorine rubber and the like are preferable because of their high heat resistance. An inorganic compound such as silica or alumina may be added to the surface of the pressure roll.

A thickness of the film for film capacitors is 0.5 micron to 10.0 microns, preferably 1.0 micron to 7.0 microns, more preferably 1.5 microns to 5.0 microns. This is because, if the thickness of the film for film capacitors is less than 0.5 micron, a tensile strength of the film for film capacitors extremely lowers, thus making it difficult to manufacture films for film capacitors. This is also because, if the thickness of the film for film capacitors exceeds 10.0 microns, an electrostatic capacitance per volume is reduced.

According to the above-described composition, a film for film capacitors is manufactured using a molding material prepared by mixing a polyetherimide resin whose temperature at a glass transition point is 200 degrees centigrade or more and a fluorine resin whose continuous use temperature is 200 degrees centigrade or more with each other. As a result, it is possible to obtain a film for film capacitors having heat resistance making it usable even at a temperature of 150 degrees centigrade or more, excellent voltage proof, and slidability exerted by an effect of mixing the fluorine resin. Further, a film for film capacitors can be obtained without occurrence of streaks or wrinkles on the surface.

EXAMPLES

Hereinafter, a method of manufacturing films for film capacitors and a film for film capacitors, according to the present invention, will be described referring to examples and comparative examples. The method of manufacturing films for film capacitors and the film for film capacitors, according to the present invention, are not limitative to these examples that follow.

Polyetherimide resin: Trade name "Ultem 1010-1000", Available from SABIC Innovative Plastics Japan, Glass transition point of 223 degrees centigrade.

Fluorine resin: Trade name "Fluon PFA P-62XP", Available from Asahi Glass Co., Ltd, PFA resin, Melt viscosity of 11,100 poises at 360 degrees centigrade;

Fluorine-based surfactant: Trade name "KFBS", Available from Mitsubishi Materials Electronic Chemicals Co., Ltd, Potassium Nonafluorobutane sulfonate ($C_4F_9SO_3K$)

Figure 4:
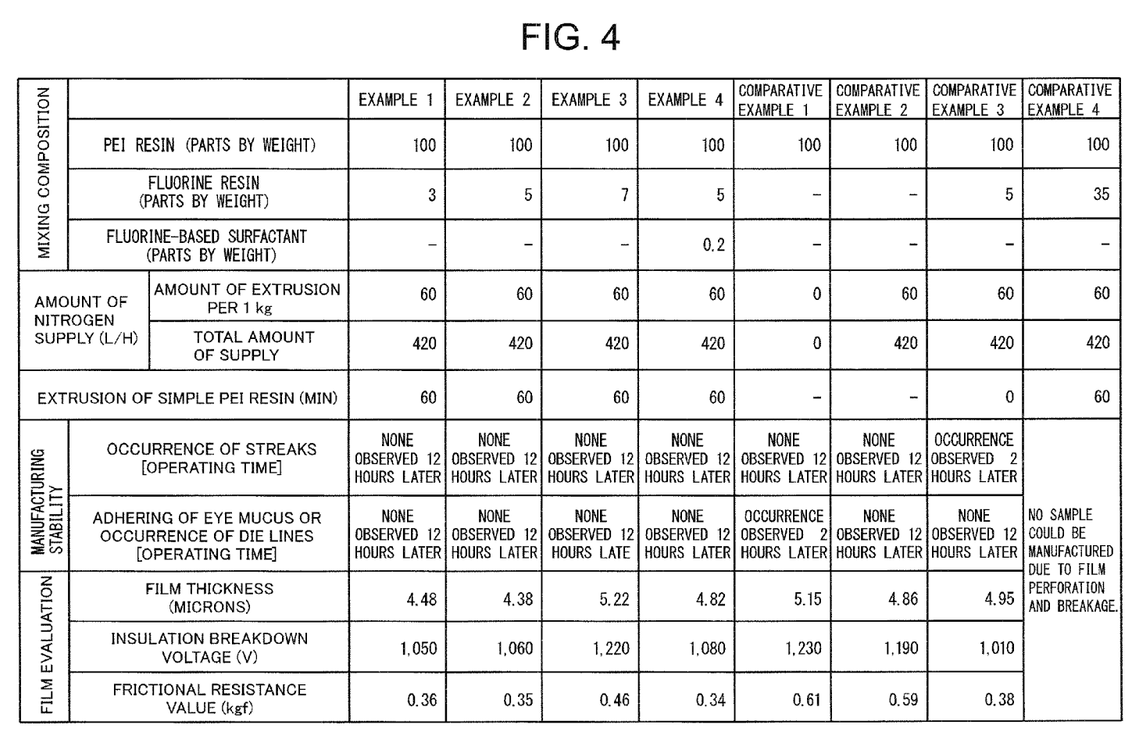
FIG. 4 is a tabular view showing an relationship of mixing composition, amount of nitrogen supply, and extrusion time of simple polyetherimide resin, to manufacturing stability, and film evaluation, in examples and comparative examples according to the present invention.

FIG. 4 is a tabular view showing a relationship of mixing composition, amount of nitrogen supply, simple polyetherimide resin extrusion time, to manufacturing stability and film evaluation in examples and comparative examples according to the present invention. Molding materials of Examples 1 to 4 and Comparative Examples 3 and 4 were prepared by injecting 100 parts by mass of the polyetherimide resin of 10 kg into a tumbler mixer, injecting therein a fluorine resin in parts by mass as described in FIG. 4 and stirring and mixing it for 30 minutes. A mixture thus obtained by stirring and mixing the polyetherimide resin and the fluorine resin was supplied to a vacuum pump-mounted high speed twin screw extrusion molder of 30 mm in diameter (PCM30, L/D=35, Available from IKEGAI Ltd. The supplied mixture was melted and kneaded at a cylinder temperature of 320 to 350 degrees centigrade, at an adaptor temperature of 360 degrees centigrade, and at a die temperature of 360 degrees under reduced pressure. The resultant mixture was extruded from a die to a rod shape. The extruded mixture was cut after water cooling and a number of pellets of the resin composition were prepared in length of 4 mm to 6 mm and in diameter 2 mm to 4 mm, respectively. In addition, as Comparative Examples 1 and 2, pellets of a simple polyetherimide resin were used as shown in FIG. 4.

The prepared molding material of the resin composition was left and dried for 24 hours in a hot air oven with an exhaust port, heated to 160 degrees centigrade. The moisture content of the resin composition after drying was 250 ppm. This resin composition was supplied to a single screw extruder of 40 mm in diameter and L/D=25 (available from IKG, Ltd. The supplied resin composition was melted and kneaded under a cylinder temperature of 320 to 350 degrees centigrade, using a full-freight extrusion screw of 2.5 in compression ratio and was continuously extruded from a T-die of 400 mm in width adjusted to a lip clearance of 0.3 mm under the T-die temperature of 350 to 360 degrees centigrade and an extrusion amount of 7 kg/hour. This extruded film for film capacitors was cooled after pinching between a pressure roll and a cooling roll in a pulling unit. Both the side end portions of the cooled film were cut out continuously using slit blades disposed in a winder, and the film for film capacitors was wound by a winding pipe, whereby a film for film capacitors, having a thickness of 5 microns, a length of 1,000 m, and a width of 250 mm was manufactured. An extrusion operation time of a simple polyetherimide resin after starting extrusion is described in FIG. 4.

As shown in FIG. 3, a spacer 3 was placed on a material injection port 1c of an extruder 1, by which a gas supply pipe 3 made from SUS was held. A distance A from an outer circumferential end of an extrusion screw 1a to a lower end of the pipe was adjusted to 8 mm. A nitrogen gas was supplied from a nitrogen gas cylinder with a supply pressure being adjusted to 0.4 MPa, and the amount of the gas, shown in FIG. 4, was supplied using a flow meter.

Manufacturing stability was evaluated during manufacture of films for film capacitors; and as to the obtained film for film capacitors, a frictional coefficient and an dielectric breakdown voltage were measured. The results are summarized in FIG. 4.

Manufacturing stability was evaluated based upon an operation time from start of manufacturing (start of extrusion) to an occurrence of streams, eye mucus, and die lines, by way of visual check. Here, "stream" was defined as a phenomenon that thin portions and thick portions of the molten resins were produced in striped shape from the inside of a lip portion of a T-die, "eye mucus" was defined as those produced when a molten resin adhered and solidified to the lip portion "die line" was defined as a phenomenon of being frictionally scrubbed on a film surface for film capacitors by the eye mucus adhering to the lip portion. In addition, it was checked whether perforation and breakage of a film for film capacitors occur.

(Measurement and Evaluation)
(Melt Viscosity)

A melt viscosity was measured using a Flow Tester (Shimadzu Flowtester CFT-500 model A, available from Shimadzu Corporation). As for the measurement, resins of 1.5 cm$^3$ were filled in a cylinder (cylinder temperature: 360 degrees centigrade) to which a die (diameter: 1 mm, length: 10 mm) was mounted; a plunger (area: 1 cm$^2$) was attached to a top part; when the cylinder temperature reached 360 degrees centigrade, preheating was performed for 5 minutes; after the preheating, a load of 490 N was applied immediately; and the resin was melted and flown out, whereby the melt viscosity was measured.

(Thickness of Film for Film Capacitors)

A thickness of a film for film capacitors was obtained based on an average thickness at 19 points in a film widthwise direction and 95 points at 5 positions in a film flow direction, using a contact-type thickness meter (Trade name: Electronic Micrometer MILLITRON 1240. Available from Mahr Ltd.)

(Frictional Resistance Value)

A frictional resistance value of a film for film capacitors was measured in conformity with JIS K 7125-1999. Specifically, a dynamic frictional force with a glass at a testing velocity of 100 mm/min was measured in an environment of 23 degrees centigrade, 50% RH, using a universal material testing instrument (TENSILON, available from A&D Company, Limited)

(Dielectric Breakdown Voltage of Film for Film Capacitors)

A dielectric breakdown voltage of a film for film capacitors was measured by a short-time dielectric breakdown test using an aerial technique in conformity with JIS C 2110-1994. This measurement was implemented in an environment of 23 degrees centigrade. A columnar electrode (top shape: 25 mm in diameter, 25 mm in height; and bottom shape: 25 mm in diameter, 15 mm in height) was used.

As is evident from the results shown in FIG. 4, in Comparative Example 1 where a polyetherimide resin was used solely and the air was not replaced with a nitrogen gas, adhering of eye mucus and die lines occurred in 2 hours. A shown In Comparative Example 2 where a polyetherimide resin was used solely and the air was replaced with the nitrogen gas, though the adhering of eye mucus and the occurrence of the die lines were restrained, slidability lowered which is ascribed to a measured frictional resistance of 0.59 exceeding 0.50. In addition, in Comparative Example 3 where a resin composition obtained by mixing a polyetherimide resin and a fluorine resin with each other was used but a pretreatment for extrusion in a simple polyetherimide resin was not performed, the occurrence of streaks was observed in 2 hours. Further, in Comparative Example 4 where a resin composition obtained by mixing a polyetherimide resin and a fluorine resin with each other was used and a pretreatment for extrusion in a simple polyetherimide resin was performed, but an additive amount of the fluorine resin in the resin composition was 35 parts by mass which exceeded 30 parts by mass, no sample could be manufactured due to film perforation and breakage.

On the contrary, the film for film capacitors, according to each of the examples of the present invention, is free of the occurrence of streaks or adhering of eye mucus, and/or the occurrence of die lines, and is excellent in manufacturing stability, after a lapse time of 12 hours. Moreover, it is evident that slidability is imparted to the film since it exhibits an appropriate frictional resistance of 0.5 or less keeping a minimum dielectric breakdown voltage at 1,000 V or more. From the foregoing description, it becomes possible to obtain a film for capacitors, having excellent heat resistance, voltage proof and slidability.

Hereinbefore, while the present invention was described by way of embodiments, it is a matter of course that the technical scope of the present invention is not limitative to the scope described in the embodiments. It is apparent to one skilled in the art that various modifications or alterations can be made to the embodiments. It is also apparent from matters recited in the claims that such modified or altered embodiments can be included in the technical scope of the present invention.

DRAWINGS

FIG. 3
Distance A
FIG. 4
1/Mixing composition
2/PEI resin (parts by weight)
3/Fluorine resin (parts by weight)
4/Fluorine-based surfactant (parts by weight)
5/Amount of nitrogen supply (1/h)
6/Amount of extrusion of 1 kg/hour
7/Total amount of supply
8/Extrusion of simple PEI resin (min)
9/Manufacturing stability
10/Occurrence of streaks [operating time]
11/Adhering of eye mucus or occurrence of die lines [Operating time]
12/Film evaluation
13/Film thickness (microns)
14/Dielectric breakdown voltage (V)
15/Frictional resistance value (kgf)
16/Example 1
17/Example 2
18/Example 3
19/Example 4
20/Comparative Example 1
21/Comparative Example 2
22/Comparative Example 3
23/Comparative Example 4
24/None observed in 12 hours
25/Occurrence observed in 2 hours
26/No sample could be manufactured due to film perforation and breakage.

What is claimed is:

1. A method of manufacturing a film for a film capacitor, the method comprising:

injecting a molding material consisting of one or more polyetherimide resins into an extruder, and then melt extruding the film for the film capacitor from a lip portion of a tip end of a T-die;

pinching and cooling the extruded film for the film capacitor between a pressure roll and a cooling roll in a pulling unit; and winding the cooled film for the film capacitor with a predetermined thickness by means of a winder, wherein:

melt extruding the molding material consisting of one or more polyetherimide resins at a starting step of extrusion operation of the extruder is performed in an inert gas atmosphere obtained by replacing air in the extruder with an inert gas; and switching the molding material consisting of one of more polyetherimide resins to a resin composition obtained by adding 1.0 to 30.0 parts by mass of a fluorine resin to 100 parts by mass of a polyetherimide resin after the molding material consisting of one or more polyetherimide resins is fully extruded and molded, to thereby mold the film for the film capacitor.

2. The method of manufacturing the film for the film capacitor, according to claim 1, wherein the predetermined thickness is a thickness of 10 microns or less.

3. The method of manufacturing the film for the film capacitor, according to claim 1, wherein melt extrusion of the molding material consisting of one or more polyetherimide resins is performed within 30 minutes or more and 2 hours or less.

4. The method of manufacturing the film for the film capacitor, according to claim 1, wherein:

a nitrogen gas is used as the inert gas; and a supply amount of the nitrogen gas into the extruder is 10 L/hour or more and 100 L/hour or less per 1 kg of an amount of extrusion per hour.

5. The method of manufacturing the film for the film capacitor, according to claim 1, wherein the resin composition of the polyetherimide resin and the fluorine resin is comprised of a resin composition obtained by adding 0.05 parts by mass to 5.0 parts by mass of a fluorine-based surfactant, to 100 parts by mass of a resin composition obtained by adding 1.0 part by mass to 30.0 parts by mass of a fluorine resin to 100 parts by mass of the polyetherimide resin.

6. The method of manufacturing the films for the film capacitor, according to claim 1, wherein a moisture content of the molding material consisting of one or more polyetherimide resins or the resin composition of the polyetherimide resin and the fluorine resin is 5,000 ppm or less, prior to the melt extrusion.

7. The method of manufacturing the film for the film capacitor, according to claim 1, wherein a surface of the pressure roll consists of a silicone rubber or a fluorine rubber.

8. The method of manufacturing the film for the film capacitor, according to claim 1, wherein a surface of the cooling roll has a centerline average roughness of 1 micron to 10 microns.

9. The method of manufacturing the film for the film capacitor, according to claim 1, wherein the polyetherimide resin of the molding material consisting of one or more polyetherimide resins and/or the polyetherimide resin of the resin composition of the polyetherimide resin and the fluorine resin is obtained by alloying or blending one or more selected from a group consisting of a block copolymer, a random copolymer, or a modified copolymer with another monomer which can be copolymerized.

10. The method of manufacturing the film for the film capacitor, according to claim 1, wherein the resin composition of the polyetherimide resin and the fluorine resin includes one or more resins selected from a group consisting of:

a thermoplastic polyimide-based resin including a polyimide resin (PI resin) and a polyamide imide resin (PAI resin);

a polyallylene ketone-based resin including a polyether ether ketone resin (PEEK resin) and a polyether ketone resin (PK resin);

an aromatic polyethersulfone-based resin including a polysulphone resin (PSU resin), a polyether sulfone resin (PES resin) and a polyphenylene sulfone resin (PPSU resin);

a polyallylene sulfide-based resin including a polyphenylene sulfide resin (PPS resin) a polyphenylene sulfide sulfone resin and a polyphenyl sulfide ketone resin; and a thermoplastic resin including a liquid crystal polymer (LCP).

11. The method of manufacturing the film for the film capacitor, according to claim 1, wherein the fluorine resin is one or more selected from a group consisting of:

polytetrafluoroethylene having a melting point of 325 to 330° C. and a continuous use temperature of 260° C.;

tetrafluoroethylene-perfluoroalkylvinylether copolymer having a melting point of 300 to 315° C. and a continuous use temperature of 260° C.;

tetrafluoroethylene-hexafluoropropyl copolymer having a melting point of 270° C. and a continuous use temperature of 200° C.;

tetrafluoroethylene-ethylene copolymer having a melting point of 260 to 270° C. and a continuous use temperature of 150° C.;

polyvinylidene fluoride having a melting point of 170 to 175° C. and a continuous use temperature of 150° C.; and polychlorotrifluoroethylene having a melting point of 210 to 215° C. and a continuous use temperature of 120° C.

12. The method of manufacturing the film for the film capacitor, according to claim 1, wherein:

the resin composition of the polyetherimide resin and the fluorine resin comprises a resin composition obtained by adding 0.05 parts by mass to 5.0 parts by mass of one or more fluorine-based surfactant selected from a group consisting of: potassium trifluoromethanesulfonate $(CF_3SO_3K)$; sodium trifluoromethanesulfonate $(CF_3SO_3Na)$; lithium trifluoromethanesulfonate $(CF_3SO_3Li)$; potassium pentafluoroethane sulfonate $(C_2F_5SO_3K)$; sodium pentafluoroethane sulfonate $(C_2F_5SO_3Na)$; lithium pentafluoroethane sulfonate $(C_2F_5SO_3Li)$; potassium heptafluoropropane sulfonate $(C_3F_7SO_3K)$; sodium heptafluoropropane sulfonate $(C_3F_7SO_3Na)$; lithium heptafluoropropane sulfonate $(C_3F_7SO_3Li)$; potassium nonafluorobutane sulfonate $(C_4F_9SO_3K)$; sodium nonafluorobutane sulfonate $(C_4F_9SO_3Na)$; lithium nonafluorobutane sulfonate $(C_4F_9SO_3Li)$; bis(heptafluoropropane sulfonyl)imide potassium salt $((C_3F_7SO_2)_2NK)$; bis(heptafluoropropane sulfonyl)imide sodium salt $((C_3F_7SO_2)_2NNa)$; bis (nonafluorobutane sulfonyl)imide potassium salt $((C_4F_9SO_2)_2NK)$; bis(nonafluorobutane sulfonyl)imide sodium salt $((C_4F_9SO_2)_2NNa)$; cyclo-hexafluoropropane-1,3-bis(sulfonyl)imide potassium salt $(CF_2$ ($CF_2SO_2)_2NK$); cyclo-hexafluoropropane-1,3-bis(sulfonyl)imide sodium salt ($CF_2(CF_2SO_2)_2NNa$), to 100 parts by mass of the resin composition including the polyetherimide resin and the fluorine resin.

13. The method of manufacturing the film for the film capacitor, according to claim 1, wherein a lubricant includes 0.05 to 2.0 parts by mass of a polycondensation product of an ethylenediamine, stearic acid, and sebacic acid with respect to 100 parts by mass of the resin composition including the polyetherimide resin and the fluorine resin.

* * * * *